UNITED STATES PATENT OFFICE.

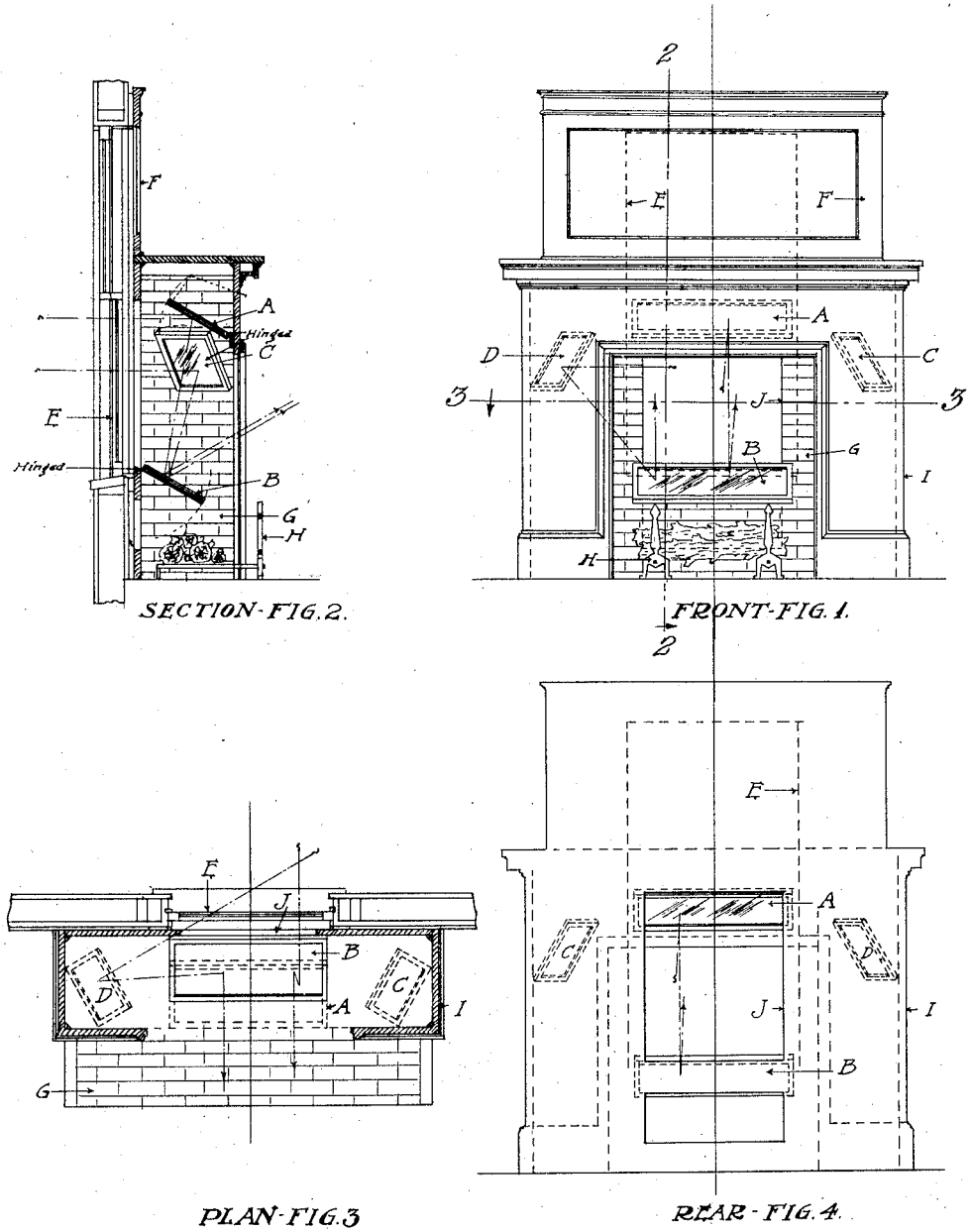

JOHN LEROY KELLOGG, OF DENVER, COLORADO.

ART OF PHOTOGRAPHY.

1,025,095.  Specification of Letters Patent.  Patented Apr. 30, 1912.

Application filed January 20, 1910. Serial No. 539,188.

*To all whom it may concern:*

Be it known that I, JOHN LEROY KELLOGG, a citizen of the United States, residing at Denver, in the city and county of Denver and State of Colorado, have invented new and useful Improvements in the Art of Photography, of which the following is a specification.

This invention relates to means for securing fire light effects upon photographic plates and has for its object to provide a simple and novel arrangement of reflectors arranged in an imitation fire-place whereby light rays entering at the back of the fire-place are reflected outwardly upon the subject.

Another object of the invention resides in the provision of an imitation fire-place arranged adjacent to the window of a studio, said fire-place having a plurality of angularly positioned mirrors arranged therein, the light rays entering the fire-place being reflected by the mirrors upon the subject sitting in front of the fire-place thereby enabling the photographer to secure the proper light on the subject before and during the exposure; and to obtain results with the ordinary and usual length of time of exposure of the plate.

With these and other objects in view, the invention consists of the novel features of construction, combination and arrangement of parts hereinafter fully described and claimed, and illustrated in the accompanying drawings, in which—

Figure 1 is a front elevation of an imitation fire-place and mantel illustrating one embodiment of the invention; Fig. 2 is a vertical section taken on the line 2—2 of Fig. 1; Fig. 3 is a section taken on the line 3—3 of Fig. 1, looking in the direction indicated by the arrows; and Fig. 4 is a rear elevation of the fire-place and mantel.

Referring more particularly to the drawing I indicates the mantel which may be of any desired ornamental construction, the lower portion of which is built to represent a fire-place, the interior of such lower portion being covered with paper marked to represent brick work as indicated at G. The upper mantel F extends above the upper edge of the lower mantel at the rear thereof. This fire-place or mantel structure is adapted to be arranged in front of one of the windows E of the studio. The back of the imitation fire-place is provided with an opening J adapted to be arranged directly in front of the window through which opening the light rays enter and are deflected upon a mirror B which is hinged at the lower edge of the opening J. Above the opening in the front wall of the imitation fire-place, a second mirror A is arranged, said mirror being hinged to the wall. The mirrors A and B are adapted to be adjusted in the fire-place to arrange them at the same or different angles in accordance with the position of the subject so as to properly direct the light rays reflected from the lower mirror B through the fire-place opening. Mirrors C and D are arranged in the fire-place structure at opposite sides of the upper and lower mirrors A and B and preferably nearer to the upper mirror A than the mirror B. These mirrors C and D are likewise adjustable to angularly position the same so as to deflect the light rays which strike thereon downwardly upon the lower mirror B. By adjusting the upper mirrors A, C and D with respect to the position of the lower mirror B, the light rays are concentrated thereon and from the lower mirror are thrown outwardly upon the subject to be photographed. The mirrors may be supported in their adjusted positions within the fire place by providing stiff frictional hinges for attaching the same to the walls thereof.

In order to enhance the realistic effect andirons H are arranged in the fire-place and upon these andirons gas logs may be arranged as shown in the drawing. In the practical use of the invention, the subject is positioned in front of the fire-place structure and the several mirrors relatively adjusted to secure the proper light and shade effects whereby the same result may be produced as would be secured by the use of a real fire, the same fire light effects being produced without subjecting the photographer and his subject to the intense heat which would be caused by employing the fire itself.

From the foregoing it will be seen that I have produced an exceedingly simple and novel arrangement of reflecting mirrors by the proper adjustment of which the illusionary effect of fire light upon the subject will be clearly reproduced upon the photographic plate which may then be exposed in the ordinary manner and the photographs printed therefrom.

The device is extremely simple, may be very inexpensively constructed and easily moved from place to place so as to position the same before any one of the studio windows whereby the necessary light may be secured.

While I have set forth in detail the particular arrangement of the several reflecting mirrors, it will be understood that they may be otherwise positioned if found desirable to secure the best possible light effects, and I therefore do not wish to be limited to the exact details of construction and arrangement as herein set forth, the invention being susceptible of considerable modification without departing from the essential feature or sacrificing any of the advantages thereof.

Having thus described the invention what is claimed is:—

The combination with an imitation fire place or mantel having an aperture in its rear wall and a fire place opening in the front wall thereof, of a mirror hinged to the lower edge of the aperture in the rear wall and disposed below the same so that light rays entering said aperture do not fall directly on said mirror, a mirror hinged to the upper edge of the fire place opening and adjustable with relation to said lower mirror, and other mirrors disposed upon opposite sides of said upper and lower mirrors and between the same, said latter mirrors and the upper mirror directly receiving the light rays and deflecting the same upon said lower mirror, whence they are reflected outwardly through the fire place opening upon the subject to be photographed.

JOHN LEROY KELLOGG.

Witnesses:
EDWARD L. WHEATLEY,
W. E. CLARK.

---

Copies of this patent may be obtained for five cents each, by addressing the "Commissioner of Patents, Washington, D. C."